United States Patent
Henck et al.

(10) Patent No.: US 9,926,949 B2
(45) Date of Patent: Mar. 27, 2018

(54) SILICONE PROPELLED PEDESTRIAN HOOD LIFTER AND SEATBELT PRE-TENSIONER

(71) Applicant: TK Holdings Inc., Armada, MI (US)

(72) Inventors: Jeremy M. Henck, White Lake, MI (US); Deborah L. Hordos, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 196 days.

(21) Appl. No.: 14/687,878

(22) Filed: Apr. 15, 2015

(65) Prior Publication Data

US 2015/0307059 A1    Oct. 29, 2015

Related U.S. Application Data

(63) Continuation-in-part of application No. 14/588,273, filed on Dec. 31, 2014.

(60) Provisional application No. 61/979,708, filed on Apr. 15, 2014.

(51) Int. Cl.
| | |
|---|---|
| *C06B 45/10* | (2006.01) |
| *D03D 23/00* | (2006.01) |
| *D03D 43/00* | (2006.01) |
| *F15B 15/19* | (2006.01) |
| *B60R 21/38* | (2011.01) |

(52) U.S. Cl.
CPC .............. *F15B 15/19* (2013.01); *B60R 21/38* (2013.01)

(58) Field of Classification Search
USPC .................................. 149/19.2, 109.2, 109.4
See application file for complete search history.

(56) References Cited

U.S. PATENT DOCUMENTS

| | | |
|---|---|---|
| 4,558,832 A | 12/1985 | Nilsson |
| 4,597,546 A | 7/1986 | Yamamoto et al. |
| 5,451,008 A | 9/1995 | Hamaue |
| 5,553,803 A | 9/1996 | Mitzkus et al. |
| 5,667,161 A | 9/1997 | Mitzkus et al. |
| 5,743,480 A | 4/1998 | Kopetzky et al. |
| 6,419,177 B2 * | 7/2002 | Stevens ............... B60R 22/4628 242/374 |
| 6,422,601 B1 | 7/2002 | Quioc |
| 6,505,790 B2 | 1/2003 | Stevens |
| 6,568,184 B2 | 5/2003 | Blackburn et al. |
| 6,659,500 B2 | 12/2003 | Whang et al. |
| 6,749,219 B2 | 6/2004 | Paul et al. |
| 6,752,421 B2 | 6/2004 | Khandhadia et al. |
| 6,789,485 B2 | 9/2004 | Moquin et al. |

(Continued)

OTHER PUBLICATIONS

International Search report issued in International Application No. PCT/US2015/26047, dated Sep. 16, 2015.

(Continued)

*Primary Examiner* — James E McDonough
(74) *Attorney, Agent, or Firm* — Meunier Carlin & Curfman LLC

(57) ABSTRACT

A pyrotechnic device contains a housing having a first end and a second end. A structural component or piston is contained within the housing. A polymer is infused into and/or about the structural component thereby accommodating the immediate ignition of the same by a known initiator/igniter in a known manner, the initiator also contained within the housing.

19 Claims, 1 Drawing Sheet

(56) References Cited

U.S. PATENT DOCUMENTS

| | | |
|---|---|---|
| 6,805,377 B2 | 10/2004 | Krupp et al. |
| 7,094,296 B1 | 8/2006 | Williams et al. |
| 7,097,203 B2 | 8/2006 | Burns et al. |
| 2002/0014076 A1 | 2/2002 | Blackburn et al. |
| 2005/0000352 A1 | 1/2005 | Yamaguchi et al. |
| 2005/0235863 A1* | 10/2005 | Stevens ............... B60R 21/2644 102/531 |
| 2005/0274440 A1 | 12/2005 | Tomiyama et al. |
| 2008/0236436 A1 | 10/2008 | Enzmann et al. |
| 2009/0260730 A1 | 10/2009 | Kodama et al. |
| 2012/0055593 A1 | 3/2012 | Kobayashi et al. |
| 2013/0126089 A1 | 5/2013 | Fredskild et al. |
| 2013/0139679 A1 | 6/2013 | Nelson |

OTHER PUBLICATIONS

Written Opinion issued of the International Search Authority in International Application No. PCT/US2015/26047, dated Sep. 16, 2015.
International Preliminary Report on Patentability issued in International Application No. PCT/US2015/26047, dated Oct. 18, 2016.
Non-Final Office Action issued in U.S. Appl. No. 14/588,273, dated Jul. 3, 2017.

* cited by examiner

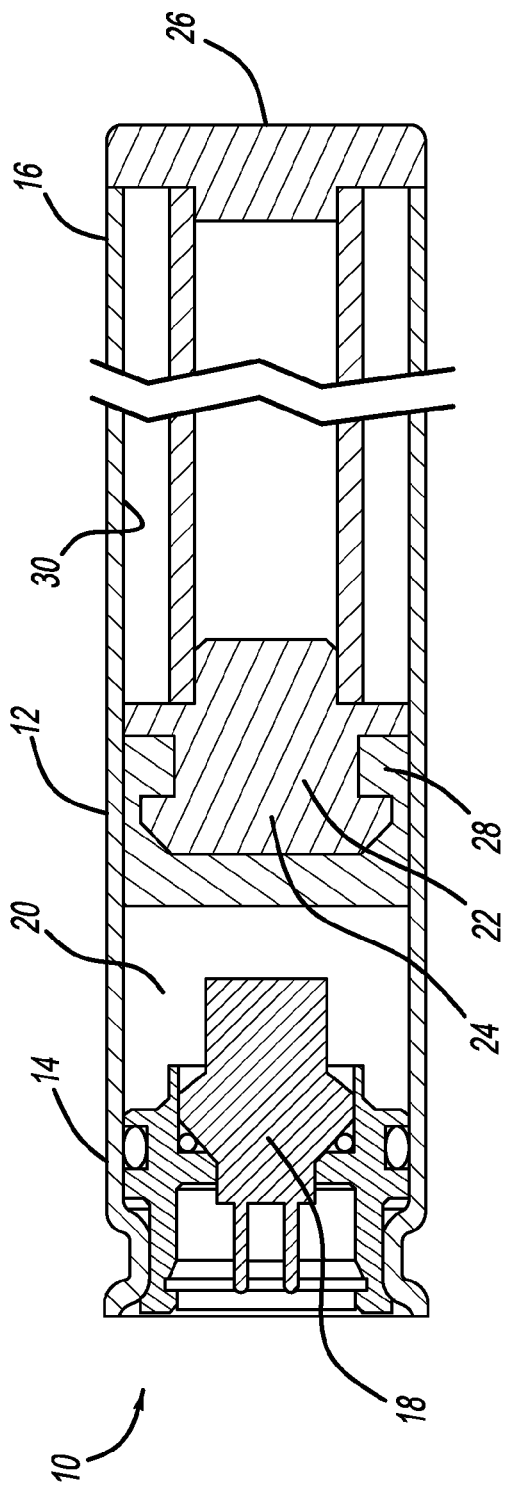
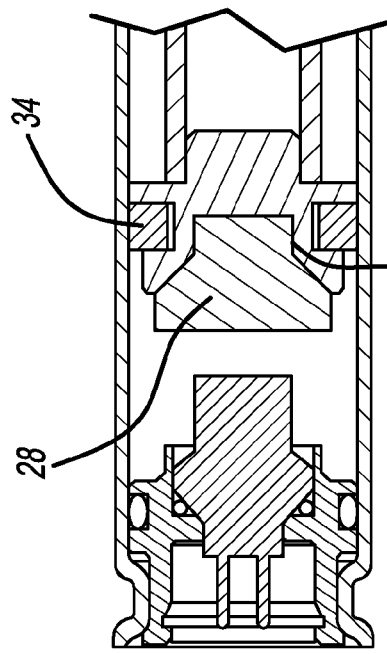
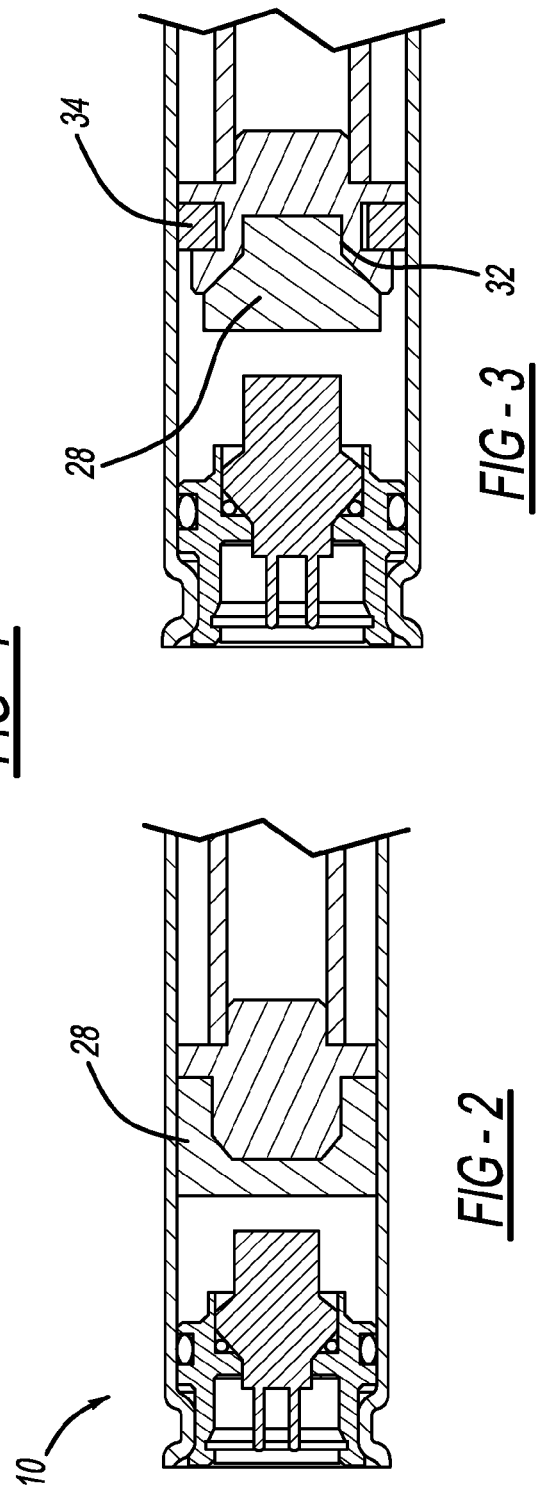

SILICONE PROPELLED PEDESTRIAN HOOD LIFTER AND SEATBELT PRE-TENSIONER

CROSS-REFERENCE TO RELATED APPLICATIONS

This application claims the benefit of U.S. Provisional Application Ser. No. 61/979,708 filed on Apr. 15, 2014. This application is also a continuation-in-part of co-owned and co-pending U.S. application Ser. No. 14/588,273 having a filing date of Dec. 31, 2034 and claims the benefit thereof.

TECHNICAL FIELD

The present invention relates generally to gas generating systems, and to an improved linear actuator or hood lifter, that may also function as a seatbelt pretensioner.

BACKGROUND OF THE INVENTION

The present invention relates to vehicle occupant protection systems or other safety systems employing pyrotechnic devices. One such pyrotechnic device may be a linear or pyrotechnic actuator to elevate a vehicle surface such as a hood, in the event of collision or impact with a pedestrian. Known linear or pyrotechnic actuators typically employ pyrotechnic means to activate a piston within an actuator. This increases the cost of manufacturing given that the gas generating composition must typically be contained, within a micro gas generator, for example. This therefore increases the complexity of the hood lifter or seat-belt pretensioner. Additionally, typical pyrotechnic compositions may increase the size of the actuator due to storage requirements within the actuator. It would therefore be an improvement to provide an alternative to the typical pyrotechnically actuated pistons. Furthermore, it would be an improvement in the art to combine the function of at least one or more structural features of the hood lifter/seat belt pretensioner, thereby simplifying the manufacture of the pyrotechnic actuator (e.g. hood lifter or seat belt pretensioner).

SUMMARY OF TOE INVENTION

A pyrotechnic actuator contains a housing having a first end and a second end. An ignition chamber is formed adjacent to the first end of the housing. The initiator is fixed at the first end in a known manner. A hollow or solid piston (or tube or cylinder) is positioned within the housing and substantially coextensive therewith, the piston having a third end and a fourth end, whereby the third end is proximate to the first, end of the housing and the fourth end is proximate to the second end, the piston extending from the first end to the second end prior to activation, of the actuator. A polymer-containing or silicone-containing member surrounds at least a portion of the third end of the piston, and at least serves as a gas generating source upon actuation of the pyrotechnic actuator. The polymer-containing or silicone-containing member of the piston may be formed as a seal as shown in FIGS. 1 and 2, whereby the silicone-containing seal is positioned flush against an inner wall of the housing. However, the silicone-containing or polymer-containing member need not be used as a seal, and instead, may be molded within a cavity formed within the third end of the piston. See FIG. 3. As shown in FIG. 3, if the silicone-containing member does not function as a seal, then an O-ring may be used as known in the art.

In accordance with the present invention, the silicone-containing or polymer-containing portion also functions as a gas generating source and may be infused or integrated with, other gas generating constituents as known in the art. In general, when forming the silicone-containing member, the uncured silicone may be mixed with one or more desired oxidizers such as one or more metal and nonmetal nitrates, perchlorates, chlorates, oxides, and mixtures thereof. Other oxidizers known for their utility within gas generating compositions are also contemplated and included herein. If desired, one or more additional fuels (silicone constitutes a first fuel) may also be mixed within the uncured silicone. These include tetrazoles such as 5-aminotetazole, salts of tetrazoles, triazoles, salts of triazoles, guanidines, guanidine derivatives such as nitroguanidine, carboxylic acids such as d,l-tartaric acid and succinic acid, and mixtures thereof. Other fuels known in the art are contemplated. Furthermore, other gas generating constituents as known in the art may also may be mixed within the uncured silicone as desired, including but not limited to coolants, burning aids, and so forth.

BRIEF DESCRIPTION OF THE DRAWINGS

FIG. 1 illustrates a first embodiment of the present invention containing a polymer-containing or silicone-containing seal also functioning as a gas generating composition.

FIG. 2 illustrates a second embodiment of the present invention containing a polymeric-containing or silicone-containing seal also functioning as a gas generating composition.

FIG. 3 illustrates a third embodiment of the present invention containing a polymer-containing or silicone-containing member molded within a complementary seat in one end of an associated piston.

DETAILED DESCRIPTION OF THE INVENTION

As shown in a first embodiment of FIG. 1, a pyrotechnic device or linear actuator 10 contains a housing 12. The housing 12 contains a first end 14 and a second end 16. An initiator or igniter 18 is fixed within the first end 14 in a known manner, such as by a body bore seal for example. An ignition chamber 20 is formed proximate to the igniter 18. A piston 22 contains a third, end 24 and a fourth end 26. In one embodiment, a silicone-containing member 28 is molded about the third end 24 so that the silicone-containing member is exposed to ignition products exiting from the igniter 18 upon actuation of the linear actuator 10. As shown in FIG. 1, the silicone-containing member 28 may be molded with an outer diameter or cross-section substantially equivalent to the inner diameter or cross-section defined by the inner wall 30 of the housing 12. As also shown in FIG. 2, the silicone-containing member 28 may be formed in various shapes, whereby the surface area of member 28 contacting the inner wall 30 may be varied, or, the amount of gas generant contained within member 28 may be varied as the size of the seal or member 28 varies.

Alternatively, other polymers may be considered for integration into a pan of the device or actuator as described herein. A moldable polymeric matrix is formed that may contain other known gas generating constituents if desired. For example, suitable polymers within the moldable polymeric matrix may include, but are not limited by, silicone, polyurethane, ethylene propylene diene monomer (EPDM), cellulosic derivatives such as cellulose acetate butyrate, and mixtures thereof. Furthermore, if additional constituents are desired, fuels may include tetrazoles such as 5-aminotetrazole, and metal or basic salts thereof, including potassium 5-aminotetrazole. Oxidizers may include alkali or alkaline earth metal nitrate salts, transition metal nitrate salts, perchlorate salts such as potassium perchlorate or ammonium perchlorate, and mixtures thereof. Other known gas generating constituents may be included, such as catalysts, coolants, and so forth.

As shown in an exemplary embodiment of FIG. 3, the polymer-containing or silicone-containing member 28 may be housed, molded, or formed within a complementary cavity 32 formed within the piston end 24. In that configuration, an O-ring 34 is annularly placed between the piston and the housing inner wall to ensure that the seal is maintained between the piston and the inner wall of the housing upon actuation of the hood lifter 10.

Exemplary silicone-containing compositions useful as a gas generating composition and, if desired, as a seal may be formed as described in U.S. Pat. Nos. 7,094,296, 7,097,203, 6,805,377, and 6,789,485, the teachings of which are herein incorporated by reference in their entireties. As otherwise described herein or as otherwise known, other compositions containing silicone may be formed and may also be used in accordance with the present invention.

In yet another aspect of the invention, and with reference to the figures, a pyrotechnic device 10 is formed by (1) providing a housing 12 having a first end 14 and a second end 16; (2) providing a structural component 22, such as the piston 22, within the housing 12, the structural component 22 having a first portion or first end 24 and a second portion or second end 26, the first portion 24 proximate to the first end 14 and the second portion 26 proximate to the second end 16; (3) providing a polymer 28 infixed at least partially into and/or about the structural, component 22 at the first portion 24; and (4) providing an initiator 18 fixed at the first end 16 and proximate to the first portion 24 of the structural component 22 for igniting the polymer 28 upon actuation of the device 10.

When used herein, the term "infused" means to integrate the polymer or silicone 28 into and and/or about the piston or structural component 22. As described herein, the polymer 28 is preferably integrated or infused into or about the structural component 22 by injecting or providing an uncured polymer 28 into or about, the first portion 24 of the piston or structural component 22 and curing the polymer 28 in situ at least partially within and/or about structural component 22 within the housing 12. The curing conditions would preferably follow the manufacturer's recommendation. It is contemplated that the polymer or silicone 28 might also be infused within the structural component or piston 22 prior to installing it within the housing 12, using standard molding procedures. Stated another way, the silicone or polymeric portion 28 could be separately molded and cured to the appropriate size and shape, and then installed within and/or about the piston end 24.

In operation, a sensor (not shown) bulk as known in the art senses a predetermined event, such as impending impact of an associated vehicle hood by a pedestrian, and thereby triggers the activation of the actuator 10 by providing an electronic stimulus to the igniter 18 for example. As the igniter 18 is activated, the ignition forces such as pressure and perhaps heat, provided by the igniter 18, provide a force great enough to drive the piston forward from its pre-actuated position. If the silicone-containing member or piston cap 28 functions as a gas generating composition and a seal as shown in FIGS. 1 and 2, then the member 28 is consumed upon actuation thereby mitigating the need to break, the seal to release the hood lifter after operation. Should the design require that the seal be maintained, then the embodiment of FIG. 3 may be utilized whereby the O-ring retains the pressure of the gas generated within the hood lifter, after operation thereof. Accordingly, the present invention accommodates the customer requirements of maintaining the pressurization of the piston for a predetermined time and thereby keeping a hood in the open condition, or, for the immediate closing of a hood after an event by breaking the respective pressure seal.

In operation, the present pressurized linear actuator 10 is activated when the igniter 18 receives a signal from a vehicle computer algorithm that responds to impact, deceleration, or other known appropriate sensor. As the pedestrian makes contact or is about to make contact with the associated vehicle and/or vehicle hood, the algorithm senses the impending or actual impact and signals the igniter to activate. Upon activation, heat and pressure products from the igniter 18 excite the air within chamber 20 to pressurize the chamber 20 and expand the gases produced by combustion of the polymer or silicone 28. In this way, the piston first end 24 is forced across the length of the body 12 to at least the second end 16. As the piston 22 is propelled within and along the length of the housing 12, the second piston end 26, larger in diameter than the rest of the piston, functions to elevate or raise the hood to mitigate the harm or injury to the pedestrian in contact therewith. Alternatively, a seatbelt pre-tensioner may be operated in a similar fashion as known in the art.

Again, it will be appreciated that the present actuator may be largely formed or manufactured as known in the art. For example, U.S. Pat. No. 6,568,184 generally teaches the basic structure of the first embodiment, and is herein incorporated by reference in Its entirety. The body or housing 12 may be drawn or otherwise metal formed as known in the art.

It should further be understood that, the preceding is merely a detailed description of various embodiments of this invention and that numerous changes to the disclosed embodiments can be made in accordance with the disclosure herein without departing from, the scope of the invention. The preceding description, therefore, is not meant to limit the scope of the invention. Rather, the scope of the invention is to be determined by the various equivalents as would be appreciated by those of ordinary skill in the art.

What is claimed is:

1. A pyrotechnic actuator comprising:
    a housing having a first end and a second end;
    a piston disposed within said housing, said piston having a third end, the third end proximate to the first end;
    a piston cap formed about the third end of the piston, the piston cap comprising a polymer and an oxidizer, the piston cap having a portion that extends axially away from the third end; and
    an initiator fixed at the first end and proximate to the third end of the piston for igniting the piston cap upon activation of the initiator.

2. The pyrotechnic actuator of claim 1 wherein said polymer comprises silicone, polyurethane, ethylene propylene diene monomer, cellulosic derivatives, or mixtures thereof.

3. The pyrotechnic actuator of claim 1 wherein said polymer comprises silicone.

4. The pyrotechnic actuator of claim 2, wherein said piston cap further comprises tetrazoles, metal salts of tetrazoles, basic salts of tetrazoles, or mixtures thereof.

5. The pyrotechnic actuator of claim 4, wherein said oxidizer comprises an alkali or alkaline earth metal nitrate salt, a transition metal nitrate salt, a metal or nonmetal perchlorate salt, or mixtures thereof.

6. A pyrotechnic actuator comprising:
a housing having a first end and a second end;
a piston disposed within said housing, said piston having a third end, the third end proximate to the first end;
a piston cap formed about the third end of the piston, the piston cap comprising a polymer and an oxidizer; and
an initiator fixed at the first end and proximate to the third end of the piston for igniting the piston cap upon activation of the initiator, wherein the piston cap has a portion that has an outer diameter that extends to an inner diameter of an inner wall of the housing.

7. The pyrotechnic actuator of claim 1, wherein the third end of the piston defines a cavity that extends axially into the third end, the portion of the piston cap is a first portion, and a second portion of the piston cap extends into the cavity.

8. The pyrotechnic actuator of claim 1, wherein the piston defines a groove that extends radially inwardly and is adjacent the third end of the piston.

9. The pyrotechnic actuator of claim 8, wherein the piston cap extends into the groove.

10. The pyrotechnic actuator of claim 8, wherein the piston cap is disposed axially spaced apart from the groove, and a seal is disposed between the groove and an inner diameter of the inner wall of the housing.

11. The pyrotechnic actuator of claim 10, wherein the piston cap has an outer diameter that is radially spaced apart from an inner wall of the housing.

12. The pyrotechnic actuator of claim 1, wherein said oxidizer comprises an alkali or alkaline earth metal nitrate salt, a transition metal nitrate salt, a metal or nonmetal perchlorate salt, or mixtures thereof.

13. The pyrotechnic actuator of claim 1, wherein said oxidizer comprises an alkali or alkaline earth metal nitrate salt.

14. The pyrotechnic actuator of claim 1, wherein said oxidizer comprises a metal or nonmetal perchlorate salt.

15. The pyrotechnic actuator of claim 1, wherein the piston cap further comprises tetrazoles, metal salts of tetrazoles, basic salts of tetrazoles, or mixtures thereof.

16. The pyrotechnic actuator of claim 2, wherein said oxidizer comprises an alkali or alkaline earth metal nitrate salt, a transition metal nitrate salt, a metal or nonmetal perchlorate salt, or mixtures thereof.

17. The pyrotechnic actuator of claim 6, wherein the third end of the piston defines a cavity that extends axially into the third end, and a portion of the piston cap extends into the cavity.

18. The pyrotechnic actuator of claim 6, wherein the piston defines a groove that extends radially inwardly and is adjacent the third end of the piston.

19. The pyrotechnic actuator of claim 18, wherein the piston cap extends into the groove.

* * * * *